US012651508B2

(12) United States Patent
Kearns

(10) Patent No.: US 12,651,508 B2
(45) Date of Patent: Jun. 9, 2026

(54) GAMING SYSTEM AND METHOD WITH WHEEL UPGRADE FEATURE

(71) Applicant: LNW Gaming, Inc., Las Vegas, NV (US)

(72) Inventor: John Kearns, Henderson, NV (US)

(73) Assignee: LNW Gaming, Inc., Las Vegas, NV (US)

( * ) Notice: Subject to any disclaimer, the term of this patent is extended or adjusted under 35 U.S.C. 154(b) by 161 days.

(21) Appl. No.: 18/768,114

(22) Filed: Jul. 10, 2024

(65) Prior Publication Data

US 2025/0046147 A1 Feb. 6, 2025

Related U.S. Application Data

(60) Provisional application No. 63/517,140, filed on Aug. 2, 2023.

(51) Int. Cl.
*G07F 17/00* (2006.01)
*G07F 17/32* (2006.01)
*G07F 17/34* (2006.01)

(52) U.S. Cl.
CPC ...... *G07F 17/3213* (2013.01); *G07F 17/3244* (2013.01); *G07F 17/3267* (2013.01); *G07F 17/34* (2013.01)

(58) Field of Classification Search
None
See application file for complete search history.

(56) References Cited

U.S. PATENT DOCUMENTS 5,235,728 A * 8/1993 Nordberg ............. G08B 3/1058 224/667
5,323,650 A * 6/1994 Fullen .................. A61B 5/1036 600/592
5,697,538 A * 12/1997 Goldenberg ......... G08B 3/1058 224/676
5,699,041 A 12/1997 Ballyns
5,755,367 A * 5/1998 Yamada ................. H04B 1/086 224/678
5,764,164 A * 6/1998 Cartabiano ............. G06F 3/014 400/100
5,829,102 A * 11/1998 Conti ...................... H04M 1/04 24/3.12
5,983,458 A * 11/1999 Jackson .................. A45F 5/021 24/3.12
6,149,043 A * 11/2000 Goto .................... G08B 3/1058 24/511
D434,898 S * 12/2000 Jokinen .......................... D3/218

(Continued)

*Primary Examiner* — Paul A D'Agostino

(57) ABSTRACT

There are provided a gaming machine and method that utilize game-logic circuitry and a presentation assembly configured to display a plurality of reels, an array, a persistent element, and a wheel. The persistent element is associated with a feature including the wheel. The reels are spun and stopped to land symbols from the reels in the array. In response to the landed symbols including an accumulation symbol, the accumulation symbol is added to the persistent element, and the game-logic circuitry randomly determines whether to award a spin of the wheel. In response to not awarding the spin of the wheel, a prize on the wheel is upgraded. In response to awarding the spin of the wheel, the wheel is spun and stopped to award a prize on the wheel.

12 Claims, 9 Drawing Sheets

(56) References Cited

U.S. PATENT DOCUMENTS

| | | | | |
|---|---|---|---|---|
| 6,213,619 | B1 * | 4/2001 | Yu | F21V 21/145 362/396 |
| 6,264,079 | B1 * | 7/2001 | Skaggs | F41C 33/041 D3/222 |
| 6,443,343 | B2 * | 9/2002 | Kamiya | H04B 1/385 224/678 |
| 6,889,879 | B2 * | 5/2005 | Rivera | A45F 5/021 224/904 |
| 6,890,255 | B2 | 5/2005 | Jarvis et al. | |
| 7,011,581 | B2 | 3/2006 | Cole et al. | |
| 7,179,169 | B2 | 2/2007 | Beaulieu et al. | |
| 7,198,570 | B2 | 4/2007 | Rodgers et al. | |
| 7,354,342 | B2 | 4/2008 | Paulsen et al. | |
| 7,425,176 | B2 | 9/2008 | Nelson et al. | |
| 7,425,177 | B2 | 9/2008 | Rodgers et al. | |
| 7,431,649 | B2 | 10/2008 | Webb et al. | |
| 7,540,806 | B2 | 6/2009 | Tastad | |
| 7,553,233 | B2 | 6/2009 | Jarvis et al. | |
| 7,597,618 | B2 | 10/2009 | Webb et al. | |
| 7,618,316 | B2 | 11/2009 | Cole et al. | |
| 7,625,278 | B2 | 12/2009 | Paulsen et al. | |
| 7,674,172 | B2 | 3/2010 | Miltenberger et al. | |
| 7,690,978 | B2 | 4/2010 | Webb et al. | |
| 7,708,628 | B2 | 5/2010 | Baerlocher | |
| 7,731,581 | B2 | 6/2010 | Chamberlain et al. | |
| 7,749,074 | B2 | 7/2010 | Cole et al. | |
| 7,762,883 | B2 | 7/2010 | Griswold et al. | |
| 7,785,185 | B2 | 8/2010 | Webb et al. | |
| 7,793,361 | B2 * | 9/2010 | Ishihara | A44C 5/14 2/170 |
| 7,794,317 | B2 | 9/2010 | Kaminkow et al. | |
| 7,819,741 | B1 | 10/2010 | Luciano | |
| 7,823,883 | B1 | 11/2010 | Kelly et al. | |
| 7,828,115 | B2 | 11/2010 | Sayles | |
| 7,841,936 | B2 | 11/2010 | Berman et al. | |
| 7,862,422 | B2 | 1/2011 | Garamendi et al. | |
| 7,874,913 | B2 | 1/2011 | Webb et al. | |
| 7,980,945 | B2 | 7/2011 | Gatto et al. | |
| 8,100,754 | B2 | 1/2012 | Bigelow, Jr. et al. | |
| 8,118,666 | B2 * | 2/2012 | Nicely | G07F 17/3244 463/16 |
| 8,142,273 | B2 | 3/2012 | Williams et al. | |
| 8,152,171 | B2 | 4/2012 | Miltenberger et al. | |
| 8,197,326 | B2 | 6/2012 | Chamberlain et al. | |
| 8,210,944 | B2 | 7/2012 | Mead | |
| 8,241,105 | B1 | 8/2012 | Luciano et al. | |
| 8,246,439 | B2 | 8/2012 | Kelly et al. | |
| 8,246,445 | B2 | 8/2012 | Rodgers et al. | |
| 8,246,452 | B2 | 8/2012 | Vallejo et al. | |
| 8,256,071 | B2 * | 9/2012 | Okuda | A45F 5/02 24/517 |
| 8,267,767 | B2 | 9/2012 | Kryuchkov et al. | |
| 8,308,547 | B2 | 11/2012 | Walker et al. | |
| 8,322,586 | B2 * | 12/2012 | Davis | B26B 3/06 224/232 |
| 8,371,935 | B2 | 2/2013 | Vallejo et al. | |
| 8,388,436 | B2 | 3/2013 | Rodgers et al. | |
| 8,414,381 | B2 | 4/2013 | Hein et al. | |
| 8,425,316 | B2 | 4/2013 | Silva et al. | |
| 8,449,372 | B2 | 5/2013 | Glenn, II et al. | |
| 8,460,098 | B2 | 6/2013 | Mead | |
| 8,523,672 | B2 | 9/2013 | Kryuchkov et al. | |
| 8,535,141 | B2 | 9/2013 | Rommerdahl et al. | |
| 8,535,148 | B2 | 9/2013 | Vallejo et al. | |
| 8,597,103 | B2 | 12/2013 | Bigelow, Jr. et al. | |
| 8,622,825 | B2 | 1/2014 | Griswold et al. | |
| 8,628,403 | B2 | 1/2014 | Cole et al. | |
| 8,641,507 | B2 | 2/2014 | Kelly et al. | |
| 8,651,941 | B2 | 2/2014 | Rodgers et al. | |
| 8,651,942 | B2 | 2/2014 | Rodgers et al. | |
| 8,747,211 | B2 | 6/2014 | Vallejo et al. | |
| 8,752,974 | B2 * | 6/2014 | Leibowitz | A63B 71/0686 362/109 |
| 8,771,051 | B2 | 7/2014 | Mattice et al. | |
| 8,814,676 | B2 | 8/2014 | De Courssou et al. | |
| 8,834,259 | B2 | 9/2014 | Rommerdahl et al. | |
| 8,851,972 | B2 | 10/2014 | Rodgers et al. | |
| 8,956,216 | B1 | 2/2015 | Lesourd et al. | |
| 8,956,217 | B1 | 2/2015 | Brooks et al. | |
| 8,974,280 | B2 | 3/2015 | Lesourd | |
| 8,979,636 | B2 | 3/2015 | Brooks et al. | |
| 8,986,106 | B2 | 3/2015 | Nicely | |
| 8,998,704 | B2 | 4/2015 | Lesourd et al. | |
| 9,004,329 | B2 * | 4/2015 | Hsieh | A44C 5/00 224/221 |
| 9,005,004 | B2 | 4/2015 | Nicely | |
| 9,070,248 | B2 | 6/2015 | Brooks et al. | |
| D735,988 | S * | 8/2015 | Hull | D3/229 |
| 9,109,396 | B2 | 8/2015 | William | |
| 9,135,774 | B2 | 9/2015 | Lemay et al. | |
| 9,280,865 | B2 | 3/2016 | Berry, III et al. | |
| 9,418,504 | B2 | 8/2016 | Lemay et al. | |
| 9,451,817 | B2 * | 9/2016 | Oh | H04M 1/04 |
| 9,451,821 | B1 * | 9/2016 | Estigoy | F16B 2/245 |
| 9,515,692 | B2 * | 12/2016 | Smith | H04M 1/04 |
| 9,552,686 | B2 | 1/2017 | Mattice et al. | |
| 9,566,501 | B2 | 2/2017 | Stasson et al. | |
| 9,568,144 | B2 * | 2/2017 | Pernu | F16M 13/00 |
| 9,570,249 | B1 * | 2/2017 | Douglas | H01H 9/025 |
| 9,622,557 | B1 * | 4/2017 | Beavers | A45F 5/00 |
| 9,659,430 | B2 | 5/2017 | Nicely et al. | |
| 9,693,622 | B1 * | 7/2017 | Hackett | H04B 1/385 |
| 9,773,378 | B2 | 9/2017 | Louie et al. | |
| 9,972,161 | B2 | 5/2018 | Bernard et al. | |
| 9,990,802 | B2 | 6/2018 | Rodgers et al. | |
| 10,062,237 | B2 | 8/2018 | Devine et al. | |
| 10,076,701 | B2 | 9/2018 | Mercer et al. | |
| 10,105,591 | B2 | 10/2018 | Mercer et al. | |
| 10,115,273 | B2 | 10/2018 | Uss et al. | |
| 10,118,087 | B2 | 11/2018 | Mercer et al. | |
| 10,165,851 | B1 * | 1/2019 | Downs | F21V 33/0008 |
| 10,238,954 | B2 | 3/2019 | Stasson et al. | |
| 10,332,348 | B2 | 6/2019 | Halter et al. | |
| 10,335,693 | B1 * | 7/2019 | McFarlane, Jr. | A45F 5/1525 |
| 10,354,488 | B2 | 7/2019 | Baron et al. | |
| 10,439,322 | B1 * | 10/2019 | Miller | H01R 13/5219 |
| 10,445,975 | B2 | 10/2019 | Bernard et al. | |
| 10,480,711 | B1 * | 11/2019 | Tran | A45F 5/02 |
| 10,546,457 | B2 | 1/2020 | Snow et al. | |
| 10,706,685 | B2 | 7/2020 | Nelson et al. | |
| 10,706,689 | B2 | 7/2020 | Zielinski et al. | |
| 10,741,012 | B2 | 8/2020 | Legras | |
| 10,783,748 | B1 * | 9/2020 | Peterson | G07F 17/3251 |
| 10,846,978 | B2 | 11/2020 | Bernard et al. | |
| 10,861,286 | B2 * | 12/2020 | Marsh | G07F 17/329 |
| 10,916,086 | B2 | 2/2021 | Edick | |
| 11,071,364 | B1 * | 7/2021 | Fowler | A45F 5/00 |
| 11,202,963 | B2 * | 12/2021 | Esselstrom | A63F 13/92 |
| 11,315,382 | B2 | 4/2022 | Danielson et al. | |
| 11,383,747 | B2 | 7/2022 | Frame | |
| 11,394,215 | B1 * | 7/2022 | Bhagwan | G04G 19/10 |
| 11,462,076 | B2 | 10/2022 | Chesworth et al. | |
| 11,532,201 | B2 | 12/2022 | Bernard et al. | |
| 11,642,599 | B2 * | 5/2023 | Stark | A63F 13/98 463/46 |
| 11,647,318 | B1 * | 5/2023 | Lim | H04R 1/083 381/355 |
| 11,861,971 | B2 | 1/2024 | Danielson et al. | |
| 11,861,983 | B1 | 1/2024 | Peterson et al. | |
| 11,887,437 | B2 | 1/2024 | Peterson et al. | |
| 11,948,432 | B2 | 4/2024 | Chesworth et al. | |
| 11,978,301 | B2 | 5/2024 | Peterson et al. | |
| 12,362,596 | B2 * | 7/2025 | Barker | H02J 7/50 |
| 2003/0083121 | A1 | 5/2003 | Cole et al. | |
| 2003/0104860 | A1 * | 6/2003 | Cannon | G07F 17/3244 463/25 |
| 2004/0082373 | A1 | 4/2004 | Cole et al. | |
| 2004/0102244 | A1 | 5/2004 | Kryuchkov et al. | |
| 2005/0119042 | A1 | 6/2005 | Chamberlain et al. | |
| 2005/0166373 | A1 * | 8/2005 | Saaski | A61B 5/6807 24/712.1 |
| 2005/0215307 | A1 | 9/2005 | Jarvis et al. | |

(56) References Cited

U.S. PATENT DOCUMENTS

| | | | | |
|---|---|---|---|---|
| 2005/0227811 | A1* | 10/2005 | Shum | A63B 24/0021 482/1 |
| 2006/0068873 | A1* | 3/2006 | Gomez | G07F 17/3244 463/16 |
| 2006/0237494 | A1* | 10/2006 | Fichera | A45F 5/02 224/669 |
| 2007/0054723 | A1 | 3/2007 | Mattice et al. | |
| 2007/0054727 | A1 | 3/2007 | Garamendi et al. | |
| 2007/0060249 | A1* | 3/2007 | Gomez | G07F 17/32 463/16 |
| 2007/0117603 | A1* | 5/2007 | Seelig | G07F 17/3211 463/16 |
| 2007/0120320 | A1 | 5/2007 | Miltenberger et al. | |
| 2007/0167211 | A1 | 7/2007 | Rodgers et al. | |
| 2008/0096648 | A1 | 4/2008 | Webb et al. | |
| 2008/0108431 | A1* | 5/2008 | Cuddy | G07F 17/3276 463/27 |
| 2008/0113727 | A1 | 5/2008 | Vallejo et al. | |
| 2008/0113750 | A1 | 5/2008 | Vallejo et al. | |
| 2008/0113756 | A1 | 5/2008 | Williams et al. | |
| 2008/0176625 | A1 | 7/2008 | Kelly et al. | |
| 2008/0182638 | A1 | 7/2008 | Paulsen et al. | |
| 2008/0214264 | A1 | 9/2008 | Griswold et al. | |
| 2008/0261684 | A1 | 10/2008 | Vallejo et al. | |
| 2008/0293478 | A1* | 11/2008 | Anderson | G07F 17/3267 463/25 |
| 2008/0300039 | A9 | 12/2008 | Kelly et al. | |
| 2009/0005155 | A1 | 1/2009 | Rodgers et al. | |
| 2009/0017891 | A1 | 1/2009 | Webb et al. | |
| 2009/0020571 | A1* | 1/2009 | Toman | A45F 5/00 211/126.15 |
| 2009/0069068 | A1 | 3/2009 | Cole et al. | |
| 2009/0111577 | A1 | 4/2009 | Mead | |
| 2009/0117993 | A1 | 5/2009 | Bigelow, Jr. et al. | |
| 2009/0124364 | A1* | 5/2009 | Cuddy | G07F 17/32 463/31 |
| 2009/0176554 | A1 | 7/2009 | Vallejo et al. | |
| 2009/0290329 | A1* | 11/2009 | Barker | F21V 21/145 362/108 |
| 2009/0305771 | A1 | 12/2009 | Webb et al. | |
| 2009/0321483 | A1* | 12/2009 | Froloff | A45F 5/00 224/267 |
| 2010/0144419 | A1 | 6/2010 | Miltenberger et al. | |
| 2010/0151936 | A1* | 6/2010 | Luciano, Jr. | G07F 17/323 463/25 |
| 2010/0210339 | A1 | 8/2010 | Chamberlain et al. | |
| 2010/0234095 | A1 | 9/2010 | Cole et al. | |
| 2010/0279757 | A1 | 11/2010 | Glenn, II et al. | |
| 2011/0059789 | A1 | 3/2011 | Luciano | |
| 2011/0132181 | A1* | 6/2011 | Kockovic | G10H 1/34 84/723 |
| 2011/0165932 | A1 | 7/2011 | Rommerdahl et al. | |
| 2011/0212760 | A1 | 9/2011 | Rodgers et al. | |
| 2011/0218029 | A1 | 9/2011 | Rodgers et al. | |
| 2011/0223987 | A1 | 9/2011 | Rodgers et al. | |
| 2011/0281634 | A1 | 11/2011 | Mattice et al. | |
| 2012/0034975 | A1 | 2/2012 | Silva et al. | |
| 2012/0094741 | A1 | 4/2012 | Bigelow, Jr. et al. | |
| 2012/0157183 | A1 | 6/2012 | Mead | |
| 2012/0199501 | A1* | 8/2012 | Le Gette | H05K 5/0234 206/45.24 |
| 2012/0255978 | A1* | 10/2012 | Williams | A45F 5/00 224/219 |
| 2012/0289306 | A1 | 11/2012 | Kryuchkov et al. | |
| 2012/0302305 | A1 | 11/2012 | Vallejo et al. | |
| 2012/0302310 | A1 | 11/2012 | Kelly et al. | |
| 2013/0012317 | A1 | 1/2013 | Kryuchkov et al. | |
| 2013/0059638 | A1 | 3/2013 | Nicely | |
| 2013/0059647 | A1 | 3/2013 | Nicely | |
| 2013/0079121 | A1* | 3/2013 | Luciano, Jr. | G07F 17/32 463/25 |
| 2013/0116032 | A1* | 5/2013 | Lutnick | G07F 17/3279 463/25 |
| 2013/0143650 | A1 | 6/2013 | Rodgers et al. | |
| 2013/0157758 | A1 | 6/2013 | Vallejo et al. | |
| 2013/0168429 | A1* | 7/2013 | Pearce | A45F 5/021 224/676 |
| 2013/0237327 | A1 | 9/2013 | Lemay et al. | |
| 2013/0274011 | A1* | 10/2013 | Meyer | G07F 17/3267 463/31 |
| 2014/0018142 | A1 | 1/2014 | Rommerdahl et al. | |
| 2014/0018146 | A1* | 1/2014 | Zielinski | G07F 17/3267 463/20 |
| 2014/0018164 | A1 | 1/2014 | Vallejo et al. | |
| 2014/0087855 | A1* | 3/2014 | Caputo | G07F 17/3225 463/26 |
| 2014/0087861 | A1* | 3/2014 | Basallo | G07F 17/32 463/29 |
| 2014/0098219 | A1 | 4/2014 | Berry, III et al. | |
| 2014/0106843 | A1 | 4/2014 | Cole et al. | |
| 2014/0256435 | A1 | 9/2014 | Lemay et al. | |
| 2014/0302909 | A1* | 10/2014 | Meyer | G07F 17/326 463/20 |
| 2015/0011296 | A1 | 1/2015 | Rodgers et al. | |
| 2015/0038213 | A1* | 2/2015 | Meyer | G07F 17/34 463/20 |
| 2015/0050978 | A1 | 2/2015 | Brooks et al. | |
| 2015/0050979 | A1 | 2/2015 | Lesourd et al. | |
| 2015/0050980 | A1 | 2/2015 | Lesourd et al. | |
| 2015/0050981 | A1 | 2/2015 | Brooks et al. | |
| 2015/0050982 | A1 | 2/2015 | Brooks et al. | |
| 2015/0080087 | A1 | 3/2015 | Nicely et al. | |
| 2015/0087378 | A1* | 3/2015 | Louie | G07F 17/34 463/17 |
| 2015/0190720 | A1* | 7/2015 | Buller | A63F 13/98 463/47 |
| 2015/0362824 | A1* | 12/2015 | Cunningham, III | F16M 13/04 396/420 |
| 2016/0019748 | A1 | 1/2016 | Lemay et al. | |
| 2016/0030798 | A1* | 2/2016 | Boekema | A63B 21/023 482/139 |
| 2016/0030831 | A1 | 2/2016 | Stasson et al. | |
| 2016/0042591 | A1 | 2/2016 | Bernard et al. | |
| 2016/0093133 | A1 | 3/2016 | Kelly et al. | |
| 2016/0093139 | A1 | 3/2016 | Zielinski et al. | |
| 2016/0104344 | A1* | 4/2016 | Meyer | G07F 17/3258 463/20 |
| 2016/0131343 | A1* | 5/2016 | Dulasky | A45F 5/021 224/578 |
| 2016/0183667 | A1* | 6/2016 | MacColl | A45F 5/00 224/222 |
| 2016/0211875 | A1* | 7/2016 | Smith | H04M 1/04 |
| 2016/0217657 | A1 | 7/2016 | Halter et al. | |
| 2016/0300454 | A1 | 10/2016 | Uss et al. | |
| 2016/0317086 | A1* | 11/2016 | Smith | A61B 5/681 |
| 2017/0087445 | A1 | 3/2017 | Stasson et al. | |
| 2017/0087446 | A1 | 3/2017 | Mercer et al. | |
| 2017/0087450 | A1 | 3/2017 | Mercer et al. | |
| 2017/0092037 | A1 | 3/2017 | Snow et al. | |
| 2017/0228976 | A1* | 8/2017 | Chesworth | G07F 17/3262 |
| 2017/0243451 | A1* | 8/2017 | Alghooneh | G08B 6/00 |
| 2017/0264329 | A1* | 9/2017 | Balmer | F16M 11/2021 |
| 2017/0266541 | A1 | 9/2017 | Mercer et al. | |
| 2018/0010883 | A1* | 1/2018 | Tedder | F41C 33/008 |
| 2018/0018851 | A1 | 1/2018 | Devine et al. | |
| 2018/0068529 | A1* | 3/2018 | Delekta | G07F 17/3262 |
| 2018/0110299 | A1* | 4/2018 | Kokkoris | A43B 3/101 |
| 2018/0151022 | A1 | 5/2018 | Bernard et al. | |
| 2018/0264312 | A1* | 9/2018 | Pompile | A63B 21/4049 |
| 2018/0316380 | A1* | 11/2018 | Buffin | A45F 5/00 |
| 2018/0335843 | A1* | 11/2018 | Erivantcev | A63F 13/211 |
| 2019/0104830 | A1* | 4/2019 | Cortellacci | A45F 5/00 |
| 2019/0213838 | A1* | 7/2019 | Hemovich | G07F 17/3216 |
| 2019/0287374 | A1* | 9/2019 | Harsdorff | A61B 5/1117 |
| 2019/0298039 | A1* | 10/2019 | Tedder | A45F 3/14 |
| 2019/0340886 | A1* | 11/2019 | Humphrey | G07F 17/3293 |
| 2019/0371125 | A1 | 12/2019 | Nelson et al. | |
| 2020/0005587 | A1* | 1/2020 | Hartl | G07F 17/3213 |
| 2020/0051373 | A1* | 2/2020 | Meyer | G07F 17/3209 |
| 2020/0074784 | A1* | 3/2020 | Caputo | G07F 17/3213 |
| 2020/0074785 | A1* | 3/2020 | Uss | G07F 17/3258 |

(56) References Cited

U.S. PATENT DOCUMENTS

2020/0098227 A1* 3/2020 Hendricks ............... G07F 17/34
2020/0168031 A1 5/2020 Legras
2020/0234392 A1 7/2020 Edick
2020/0234541 A1* 7/2020 Pierer ................. G07F 17/3267
2020/0279450 A1 9/2020 Bernard et al.
2020/0312086 A1* 10/2020 Kendall .................. G06F 7/588
2020/0320827 A1* 10/2020 Chan ................... G07F 17/3213
2020/0327778 A1 10/2020 Chesworth et al.
2020/0343745 A1* 10/2020 Choi ....................... H02J 7/731
2020/0367820 A1* 11/2020 De Araujo .............. G06F 3/017
2020/0380827 A1* 12/2020 Sanborn .............. G07F 17/3213
2020/0402347 A1* 12/2020 Pierer ..................... G07F 17/34
2021/0049869 A1* 2/2021 Chan ................... G07F 17/3267
2021/0065501 A1 3/2021 Bernard et al.
2021/0086816 A1 3/2021 Frame
2021/0217276 A1* 7/2021 Sidoti ................. G07F 17/3213
2021/0264721 A1 8/2021 Danielson et al.
2021/0279999 A1* 9/2021 Meyer ................. G07F 17/3267
2021/0280013 A1* 9/2021 Davis .................. G07F 17/3267
2021/0375095 A1* 12/2021 Delekta ............... G07F 17/3213
2021/0375097 A1* 12/2021 Coppola ............. G07F 17/3213
2022/0245992 A1 8/2022 Danielson et al.
2022/0284771 A1 9/2022 Chesworth et al.
2023/0064283 A1 3/2023 Bernard et al.
2023/0096360 A1 3/2023 Atkinson et al.
2023/0316850 A1 10/2023 Peterson et al.
2023/0343168 A1 10/2023 Milosevich
2023/0386298 A1 11/2023 Peterson et al.
2023/0410601 A1 12/2023 Peterson et al.
2023/0410602 A1 12/2023 Peterson et al.
2024/0087398 A1 3/2024 Danielson et al.
2024/0105009 A1 3/2024 Peterson et al.
2024/0105010 A1 3/2024 Peterson et al.
2024/0112547 A1 4/2024 Peterson et al.
2024/0127676 A1 4/2024 Peterson et al.
2024/0177564 A1 5/2024 Knight et al.
2024/0177567 A1 5/2024 Hornik et al.
2024/0185668 A1 6/2024 Hillstrom et al.
2024/0426570 A1* 12/2024 Sonoda ................. F41C 33/048
2025/0391247 A1* 12/2025 Jones .................. G07F 17/3267

* cited by examiner

FIG. 7
MEGA
$10,234.57
MAJOR
$798.44
GRAND
$544.97
MAXI
$268.31
MINOR
$48.33
MINI
$12.68
5000
218b
226
226
210
200
202
204

GAMING SYSTEM AND METHOD WITH WHEEL UPGRADE FEATURE

CROSS-REFERENCE TO RELATED APPLICATION(S)

This patent application claims priority benefit of U.S. Provisional Patent Application No. 63/517,140 filed Aug. 2, 2023, the disclosure of which Application is incorporated herein by reference in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2023, LNW Gaming, Inc.

FIELD OF THE INVENTION

The present invention relates to a technological improvement to gaming systems, gaming machines, and methods and, more particularly, to technological improvements in connection with a wheel upgrade feature.

BACKGROUND OF THE INVENTION

The gaming industry depends upon player participation. Players are generally "hopeful" players who either think they are lucky or at least think they can get lucky—for a relatively small investment to play a game, they can get a disproportionately large return. To create this feeling of luck, a gaming apparatus relies upon an internal or external random element generator to generate one or more random elements such as random numbers. The gaming apparatus determines a game outcome based, at least in part, on the one or more random elements.

A significant technical challenge is to improve the operation of gaming apparatus and games played thereon, including the manner in which they leverage the underlying random element generator, by making them yield a negative return on investment in the long run (via a high quantity and/or frequency of player/apparatus interactions) and yet random and volatile enough to make players feel they can get lucky and win in the short run. Striking the right balance between yield versus randomness and volatility to create a feeling of luck involves addressing many technical problems, some of which can be at odds with one another. This luck factor is what appeals to core players and encourages prolonged and frequent player participation. As the industry matures, the creativity and ingenuity required to improve such operation of gaming apparatus and games grows accordingly.

Another significant technical challenge is to improve the operation of gaming apparatus and games played thereon by increasing processing speed and efficiency of usage of processing and/or memory resources. To make games more entertaining and exciting, they often offer the complexities of advanced graphics and special effects, multiple game features with different game formats, and multiple random outcome determinations per feature. The game formats may, for example, include picking games, reel spins, wheel spins, and other arcade-style play mechanics. Inefficiencies in processor execution of the game software can slow down play of the game and prevent a player from playing the game at their desired pace.

Yet another significant technical challenge is to provide a new and improved level of game play that uses new and improved gaming apparatus animations. Improved animations represent improvements to the underlying technology or technical field of gaming apparatus and, at the same time, have the effect of encouraging prolonged and frequent player participation.

SUMMARY OF THE INVENTION

According to embodiments of the present invention, there are provided a gaming machine and method that utilize game-logic circuitry and a presentation assembly configured to display a plurality of reels, an array, a persistent element, and a wheel. The persistent element is associated with a feature including the wheel. The reels are spun and stopped to land symbols from the reels in the array. In response to the landed symbols including an accumulation symbol, the accumulation symbol is added to the persistent element, and the game-logic circuitry randomly determines whether to award a spin of the wheel. In response to not awarding the spin of the wheel, a prize on the wheel is upgraded. The prize may, for example, be a set of one or more other features such that the prize is upgraded to include at least one of these other features that is absent from the set prior to being upgraded. In response to awarding the spin of the wheel, the wheel is spun and stopped to award a prize on the wheel.

Additional aspects of the invention will be apparent to those of ordinary skill in the art in view of the detailed description of various embodiments, which is made with reference to the drawings, a brief description of which is provided below.

Figure 1:
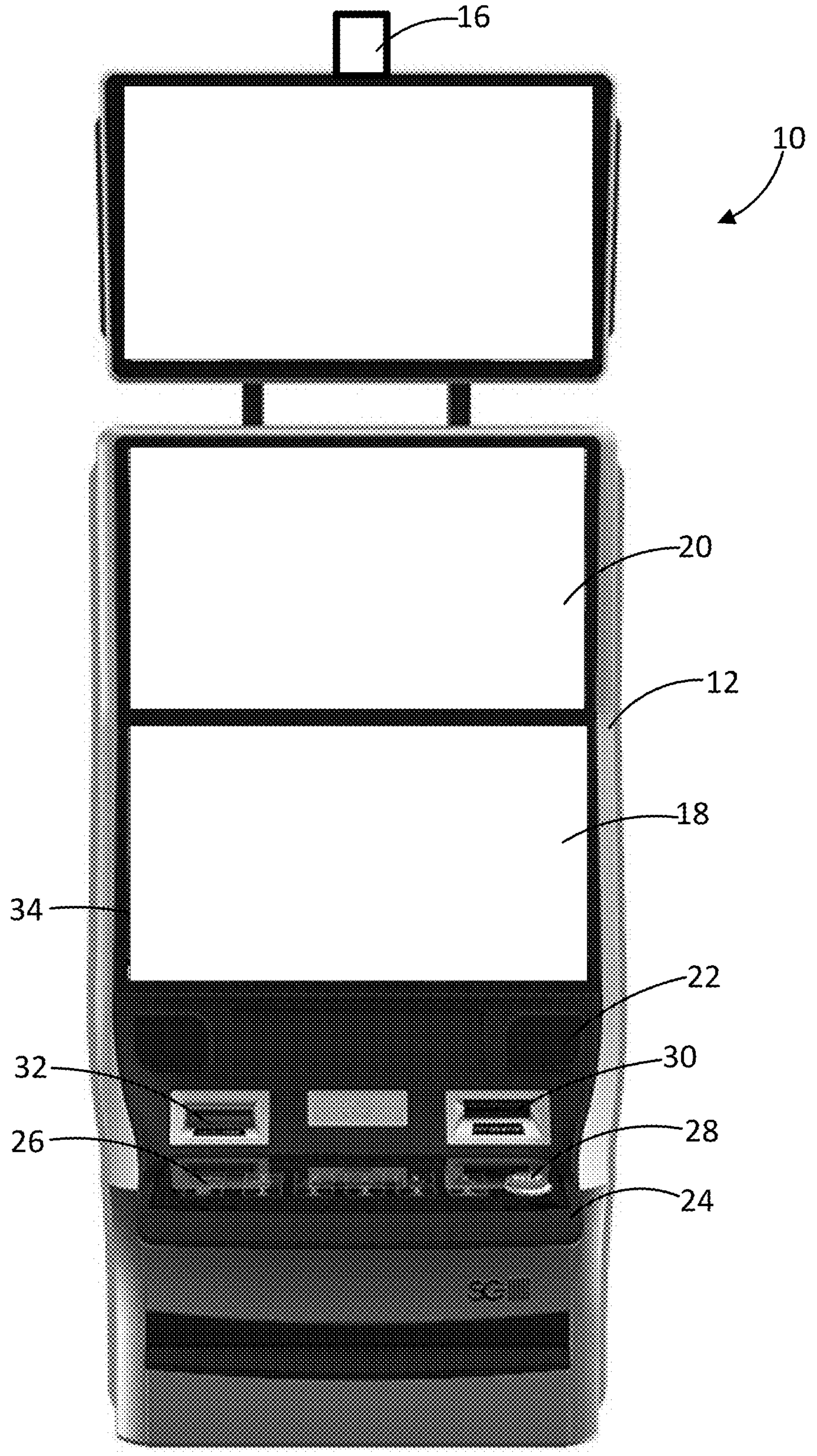
FIG. 1 is a front view of a free-standing gaming machine according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

For purposes of the present detailed description, the terms "wagering game," "casino wagering game," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game involves wagers of real money, as found with typical land-based or online casino games. In other embodiments, the wagering game additionally, or alternatively, involves wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

Referring to FIG. 1, there is shown a gaming machine 10 similar to those operated in gaming establishments, such as casinos. With regard to the present invention, the gaming machine 10 may be any type of gaming terminal or machine and may have varying structures and methods of operation. For example, in some aspects, the gaming machine 10 is an electromechanical gaming terminal configured to play mechanical slots with physical symbol-bearing reels, whereas in other aspects, the gaming machine is an electronic gaming terminal configured to play a video casino game, such as slots, keno, poker, blackjack, roulette, craps, etc. The gaming machine 10 may take any suitable form, such as floor-standing models as shown, handheld mobile units, bartop models, workstation-type console models, etc. Further, the gaming machine 10 may be primarily dedicated for use in playing wagering games, or may include non-dedicated devices, such as mobile phones, personal digital assistants, personal computers, etc. Exemplary types of gaming machines are disclosed in U.S. Pat. Nos. 6,517,433, 8,057,303, and 8,226,459, which are incorporated herein by reference in their entireties.

The gaming machine 10 illustrated in FIG. 1 comprises a gaming cabinet 12 that securely houses various input devices, output devices, input/output devices, internal electronic/electromechanical components, and wiring. The cabinet 12 includes exterior walls, interior walls and shelves for mounting the internal components and managing the wiring, and one or more front doors that are locked and require a physical or electronic key to gain access to the interior compartment of the cabinet 12 behind the locked door. A notification mechanism 16, such as a candle or tower light, is mounted to the top of the cabinet 12. It flashes to alert an attendant that change is needed, a hand pay is requested, or there is a potential problem with the gaming machine 10.

The input devices, output devices, and input/output devices are disposed on, and securely coupled to, the cabinet 12. By way of example, the output devices include a primary presentation device 18, a secondary presentation device 20, and one or more audio speakers 22. The primary presentation device 18 or the secondary presentation device 20 may be a mechanical-reel display device, a video display device, or a combination thereof. In one such combination disclosed in U.S. Pat. No. 6,517,433, a transmissive video display is disposed in front of the mechanical-reel display to portray a video image superimposed upon electro-mechanical reels. In another combination disclosed in U.S. Pat. No. 7,654,899, a projector projects video images onto stationary or moving surfaces. In yet another combination disclosed in U.S. Pat. No. 7,452,276, miniature video displays are mounted to electro-mechanical reels and portray video symbols for the game. In a further combination disclosed in U.S. Pat. No. 8,591,330, flexible displays such as OLED or e-paper displays are affixed to electro-mechanical reels. The aforementioned U.S. Pat. Nos. 6,517,433, 7,654,899, 7,452,276, and 8,591,330 are incorporated herein by reference in their entireties.

The presentation devices 18, 20, the audio speakers 22, lighting assemblies, and/or other devices associated with presentation are collectively referred to as a "presentation assembly" of the gaming machine 10. The presentation assembly may include one presentation device (e.g., the primary presentation device 18), some of the presentation devices of the gaming machine 10, or all of the presentation devices of the gaming machine 10. The presentation assembly may be configured to present a unified presentation sequence formed by visual, audio, tactile, and/or other suitable presentation means, or the devices of the presentation assembly may be configured to present respective presentation sequences or respective information.

The presentation assembly, and more particularly the primary presentation device 18 and/or the secondary presentation device 20, variously presents information associated with wagering games, non-wagering games, community games, progressives, advertisements, services, premium entertainment, text messaging, emails, alerts, announcements, broadcast information, subscription information, etc. appropriate to the particular mode(s) of operation of the gaming machine 10. The gaming machine 10 may include a touch screen(s) mounted over the primary or secondary presentation devices, an input deck 24 supporting a video button panel 26 bearing touch keys and one or more mechanical push-buttons 28, a bill/ticket acceptor 30, a card reader/writer (not shown), a ticket dispenser 32, and player-accessible ports (e.g., audio output jack for headphones, video headset jack, USB port, wireless transmitter/receiver, etc.). It should be understood that numerous other peripheral devices and other elements exist and are readily utilizable in any number of combinations to create various forms of a gaming machine in accord with the present concepts.

The player input devices, such as the touch screen, video button panel 26, push-buttons 28, a mouse, a joystick, a gesture-sensing device, a voice-recognition device, and a virtual-input device, accept player inputs and transform the player inputs to electronic data signals indicative of the player inputs, which correspond to an enabled feature for such inputs at a time of activation (e.g., pressing a "Max Bet" button or soft key to indicate a player's desire to place a maximum wager to play the wagering game). The inputs, once transformed into electronic data signals, are output to game-logic circuitry for processing. The electronic data signals are selected from a group consisting essentially of an electrical current, an electrical voltage, an electrical charge, an optical signal, an optical element, a magnetic signal, and a magnetic element.

The gaming machine 10 includes one or more value input/payment devices and value output/payout devices. In order to deposit cash or credits onto the gaming machine 10, the value input devices are configured to detect a physical item associated with a monetary value that establishes a monetary balance on a credit meter such as the "credit" meter 34. The physical item may, for example, be currency bills, coins, tickets, vouchers, coupons, cards, and/or computer-readable storage mediums. The deposited cash or credits are used to fund wagers placed on the wagering game played via the gaming machine 10. Examples of value input devices include, but are not limited to, a coin acceptor, the bill/ticket acceptor 30, a card reader/writer (not shown), a wireless communication interface for reading cash or credit data from a nearby mobile device, and a network interface for withdrawing cash or credits from a remote account via an electronic funds transfer. In response to a cashout input that initiates a payout from the monetary balance on the "credit" meter 34, the value output devices are used to dispense cash or credits from the gaming machine 10. The credits may be exchanged for cash at, for example, a cashier or redemption station. Examples of value output devices include, but are not limited to, a coin hopper for dispensing coins or tokens, a bill dispenser, a card reader/writer, the ticket dispenser 32 for printing tickets redeemable for cash or credits, a wireless communication interface for transmitting cash or credit data to a nearby mobile device, and a network interface for depositing cash or credits to a remote account via an electronic funds transfer.

Figure 2:
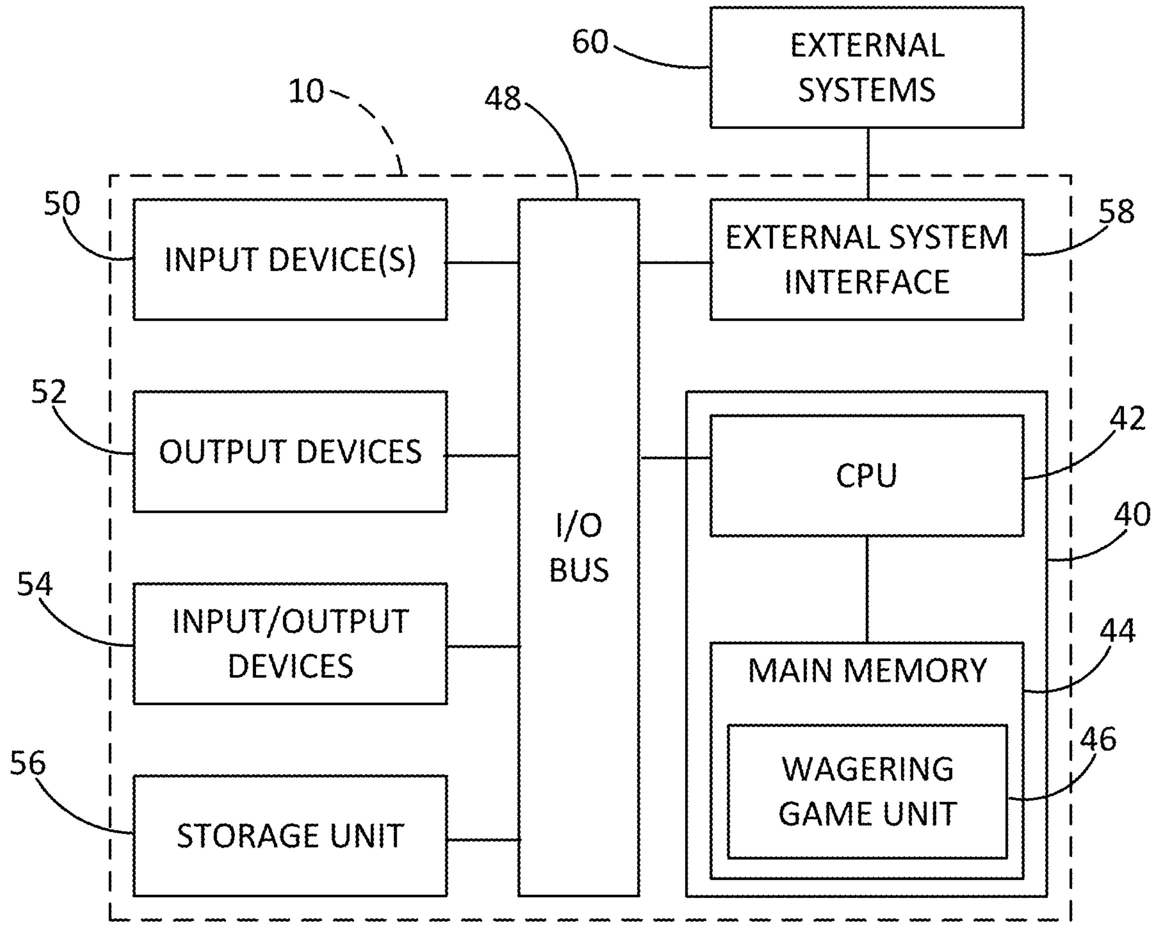
FIG. 2 is a block diagram of a gaming system according to an embodiment of the present invention.

Turning now to FIG. 2, there is shown a block diagram of the gaming-machine architecture. The gaming machine 10 includes game-logic circuitry 40 securely housed within a locked box inside the gaming cabinet 12 (see FIG. 1). The game-logic circuitry 40 includes a central processing unit (CPU) 42 connected to a main memory 44 that comprises one or more memory devices. The CPU 42 includes any suitable processor(s), such as those made by Intel and AMD. By way of example, the CPU 42 includes a plurality of microprocessors including a master processor, a slave processor, and a secondary or parallel processor. Game-logic circuitry 40, as used herein, comprises any combination of hardware, software, or firmware disposed in or outside of the gaming machine 10 that is configured to communicate with or control the transfer of data between the gaming machine 10 and a bus, another computer, processor, device, service, or network. The game-logic circuitry 40, and more specifically the CPU 42, comprises one or more controllers or processors and such one or more controllers or processors need not be disposed proximal to one another and may be located in different devices or in different locations. The game-logic circuitry 40, and more specifically the main memory 44, comprises one or more memory devices which need not be disposed proximal to one another and may be located in different devices or in different locations. The game-logic circuitry 40 is operable to execute all of the various gaming methods and other processes disclosed herein. The main memory 44 includes a wagering-game unit 46. In one embodiment, the wagering-game unit 46 causes wagering games to be presented, such as video poker, video blackjack, video slots, video lottery, etc., in whole or part.

The game-logic circuitry 40 is also connected to an input/output (I/O) bus 48, which can include any suitable bus technologies, such as an AGTL+ frontside bus and a PCI backside bus. The I/O bus 48 is connected to various input devices 50, output devices 52, and input/output devices 54 such as those discussed above in connection with FIG. 1. The I/O bus 48 is also connected to a storage unit 56 and an external-system interface 58, which is connected to external system(s) 60 (e.g., wagering-game networks).

The external system 60 includes, in various aspects, a gaming network, other gaming machines or terminals, a gaming server, a remote controller, communications hardware, or a variety of other interfaced systems or components, in any combination. In yet other aspects, the external system 60 comprises a player's portable electronic device (e.g., cellular phone, electronic wallet, etc.) and the external-system interface 58 is configured to facilitate wireless communication and data transfer between the portable electronic device and the gaming machine 10, such as by a near-field communication path operating via magnetic-field induction or a frequency-hopping spread spectrum RF signals (e.g., Bluetooth, etc.).

The gaming machine 10 optionally communicates with the external system 60 such that the gaming machine 10 operates as a thin, thick, or intermediate client. The game-logic circuitry 40—whether located within ("thick client"), external to ("thin client"), or distributed both within and external to ("intermediate client") the gaming machine 10—is utilized to provide a wagering game on the gaming machine 10. In general, the main memory 44 stores programming for a random number generator (RNG), game-outcome logic, and game assets (e.g., art, sound, etc.) all of which obtained regulatory approval from a gaming control board or commission and are verified by a trusted authentication program in the main memory 44 prior to game execution. The authentication program generates a live authentication code (e.g., digital signature or hash) from the memory contents and compare it to a trusted code stored in the main memory 44. If the codes match, authentication is deemed a success and the game is permitted to execute. If, however, the codes do not match, authentication is deemed a failure that must be corrected prior to game execution. Without this predictable and repeatable authentication, the gaming machine 10, external system 60, or both are not allowed to perform or execute the RNG programming or game-outcome logic in a regulatory-approved manner and are therefore unacceptable for commercial use. In other words, through the use of the authentication program, the game-logic circuitry facilitates operation of the game in a way that a person making calculations or computations could not.

When a wagering-game instance is executed, the CPU 42 (comprising one or more processors or controllers) executes the RNG programming to generate one or more pseudo-random numbers. The pseudo-random numbers are divided into different ranges, and each range is associated with a respective game outcome. Accordingly, the pseudo-random numbers are utilized by the CPU 42 when executing the game-outcome logic to determine a resultant outcome for that instance of the wagering game. The resultant outcome is then presented to a player of the gaming machine 10 by accessing the associated game assets, required for the resultant outcome, from the main memory 44. The CPU 42 causes the game assets to be presented to the player as outputs from the gaming machine 10 (e.g., audio and video presentations). Instead of a pseudo-RNG, the game outcome may be derived from random numbers generated by a physical RNG that measures some physical phenomenon that is expected to be random and then compensates for possible biases in the measurement process. Whether the RNG is a pseudo-RNG or physical RNG, the RNG uses a seeding process that relies upon an unpredictable factor (e.g., human interaction of turning a key) and cycles continuously in the background between games and during game play at a speed that cannot be timed by the player. Accordingly, the RNG cannot be carried out manually by a human and is integral to operating the game.

The gaming machine 10 may be used to play central determination games, such as electronic pull-tab and bingo games. In an electronic pull-tab game, the RNG is used to randomize the distribution of outcomes in a pool and/or to select which outcome is drawn from the pool of outcomes when the player requests to play the game. In an electronic bingo game, the RNG is used to randomly draw numbers that players match against numbers printed on their electronic bingo card.

The gaming machine 10 may include additional peripheral devices or more than one of each component shown in FIG. 2. Any component of the gaming-machine architecture includes hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic-disk storage media, optical storage media, flash memory, etc.

In accord with various methods of conducting a wagering game on a gaming system in accord with the present concepts, the wagering game includes a game sequence in which a player makes a wager and a wagering-game outcome is provided or displayed in response to the wager being received or detected. The wagering-game outcome, for that wagering-game instance, is then revealed to the player in due course following initiation of the wagering game. The method comprises the acts of conducting the wagering game using a gaming apparatus, such as the gaming machine 10 depicted in FIG. 1, following receipt of an input from the player to initiate a wagering-game instance. The gaming machine 10 then communicates the wagering-game outcome to the player via one or more output devices (e.g., primary presentation device 18 or secondary presentation device 20) through the presentation of information such as, but not limited to, text, graphics, static images, moving images, etc., or any combination thereof. In accord with the method of conducting the wagering game, the game-logic circuitry 40 transforms a physical player input, such as a player's pressing of a "Spin" touch key or button, into an electronic data signal indicative of an instruction relating to the wagering game (e.g., an electronic data signal bearing data on a wager amount).

In the aforementioned method, for each data signal, the game-logic circuitry 40 is configured to process the electronic data signal, to interpret the data signal (e.g., data signals corresponding to a wager input), and to cause further actions associated with the interpretation of the signal in accord with stored instructions relating to such further actions executed by the controller. As one example, the CPU 42 causes the recording of a digital representation of the wager in one or more storage media (e.g., storage unit 56), the CPU 42, in accord with associated stored instructions, causes the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM, etc.). The noted second state of the data storage media comprises storage in the storage media of data representing the electronic data signal from the CPU 42 (e.g., the wager in the present example). As another example, the CPU 42 further, in accord with the execution of the stored instructions relating to the wagering game, causes the primary presentation device 18, other presentation device, or other output device (e.g., speakers, lights, communication device, etc.) to change from a first state to at least a second state, wherein the second state of the primary presentation device comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of the stored instructions relating to the wagering game is further conducted in accord with a random outcome (e.g., determined by the RNG) that is used by the game-logic circuitry 40 to determine the outcome of the wagering-game instance. In at least some aspects, the game-logic circuitry 40 is configured to determine an outcome of the wagering-game instance at least partially in response to the random parameter.

In one embodiment, the gaming machine 10 and, additionally or alternatively, the external system 60 (e.g., a gaming server), means gaming equipment that meets the hardware and software requirements for fairness, security, and predictability as established by at least one state's gaming control board or commission. Prior to commercial deployment, the gaming machine 10, the external system 60, or both and the casino wagering game played thereon may need to satisfy minimum technical standards and require regulatory approval from a gaming control board or commission (e.g., the Nevada Gaming Commission, Alderney Gambling Control Commission, National Indian Gaming Commission, etc.) charged with regulating casino and other types of gaming in a defined geographical area, such as a state. By way of non-limiting example, a gaming machine in Nevada means a device as set forth in NRS 463.0155, 463.0191, and all other relevant provisions of the Nevada Gaming Control Act, and the gaming machine cannot be deployed for play in Nevada unless it meets the minimum standards set forth in, for example, Technical Standards 1 and 2 and Regulations 5 and 14 issued pursuant to the Nevada Gaming Control Act. Additionally, the gaming machine and the casino wagering game must be approved by the commission pursuant to various provisions in Regulation 14. Comparable statutes, regulations, and technical standards exist in or are used in other gaming jurisdictions, including for example GLI Standard #11 of Gaming Laboratories International (which defines a gaming device in Section 1.5) and N.J.S.A 5:12-23, 5:12-45, and all other relevant provisions of the New Jersey Casino Control Act. As can be seen from the description herein, the gaming machine 10 may be regulatorily approved and thus implemented with hardware and software architectures, circuitry, and other special features that differentiate it from general-purpose computers (e.g., desktop PCs, laptops, and tablets).

Figure 3:
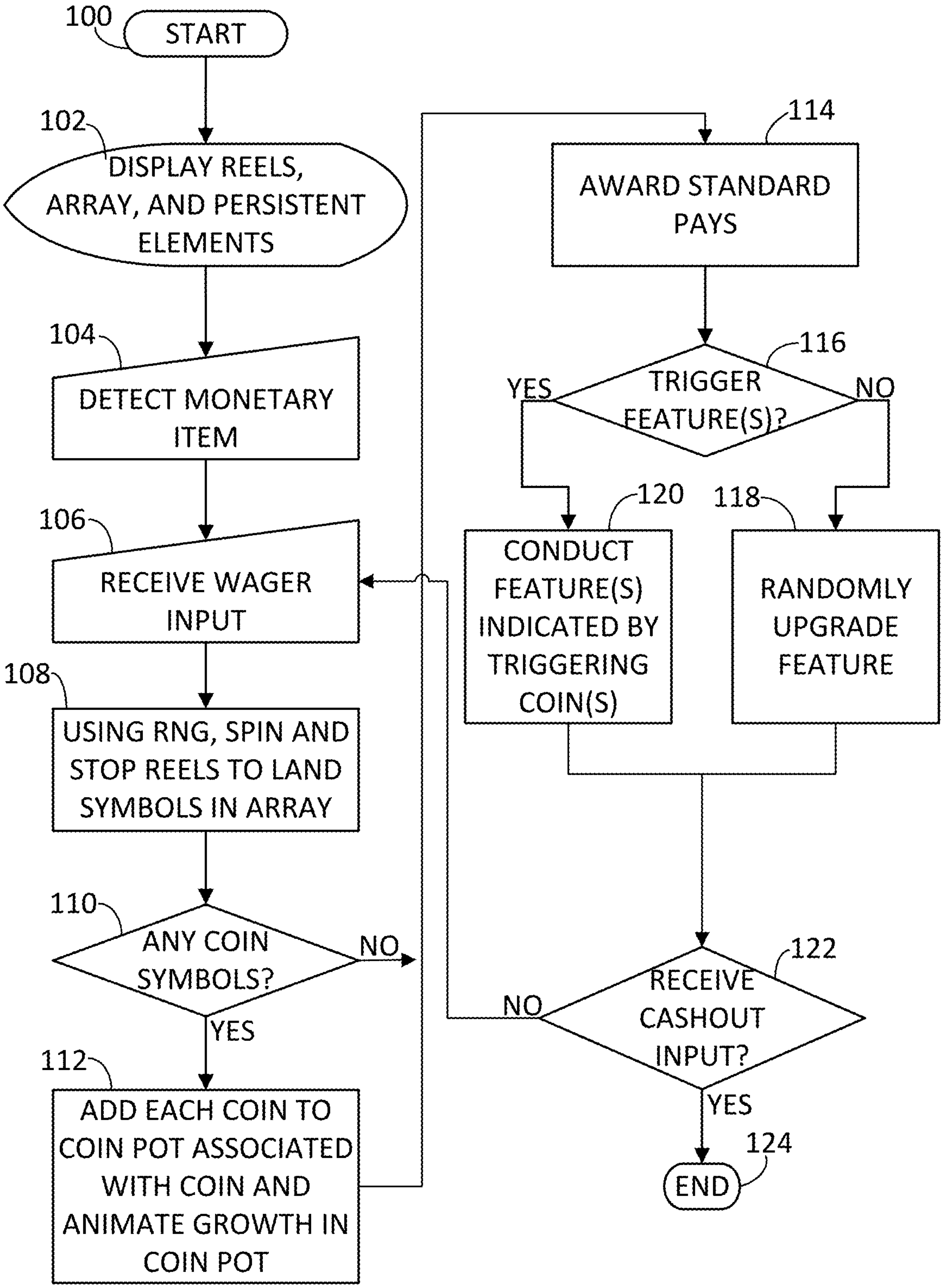
FIG. 3 is a flow diagram for a data processing method that corresponds to instructions executed by a controller, according to an embodiment of the present invention.

Referring now to FIG. 3, there is shown a flow diagram representing one data processing method corresponding to at least some instructions stored and executed by the game-logic circuitry 40 in FIG. 2 to perform operations according to an embodiment of the present invention. The data processing method is described below in connection with the exemplary presentations of spin outcomes in FIGS. 4 through 9.

Referring to FIG. 3, the data processing method commences at step 100. At step 102, the game-logic circuitry controls one or more presentation devices (e.g., mechanical-reel display device, video display device, or a combination thereof) to present a plurality of symbol-bearing reels, a symbol array, and a plurality of feature-triggering perceived persistent elements (e.g., piggy banks). Although the method is described with respect to one presentation device, it is to be understood that the presentation described herein may be performed by a presentation assembly including more than one presentation device. The plurality of reels populate an array of symbol positions. The symbol positions of the array may be arranged in a variety of configurations, formats, or structures and may comprise a plurality of rows and columns. The rows of the array are oriented in a generally horizontal direction, and the columns of the array are oriented in a generally vertical direction. The symbol positions in each row of the array are horizontally aligned with each other, and the symbol positions in each column of the array are vertically aligned with each other. Alternatively, the symbol positions may be arranged in a honeycomb configuration with adjacent columns vertically offset from each other by one-half symbol position or adjacent rows horizontally offset from each other by one-half symbol position. The number of symbol positions in different rows and/or different columns may vary from each other. The reels may be associated with the respective columns of the array such that the reels spin vertically and each reel populates a respective column. In another embodiment, the reels may be associated with the respective rows of the array such that the reels spin horizontally and each reel populates a respective row. In some embodiments, the reels are associated with respective individual symbol positions of the array such that each reel animates in place and populates only its respective symbol position. The symbol array configuration may vary between the base game and any bonus games and/or other game features utilizing the array.

Figure 4:
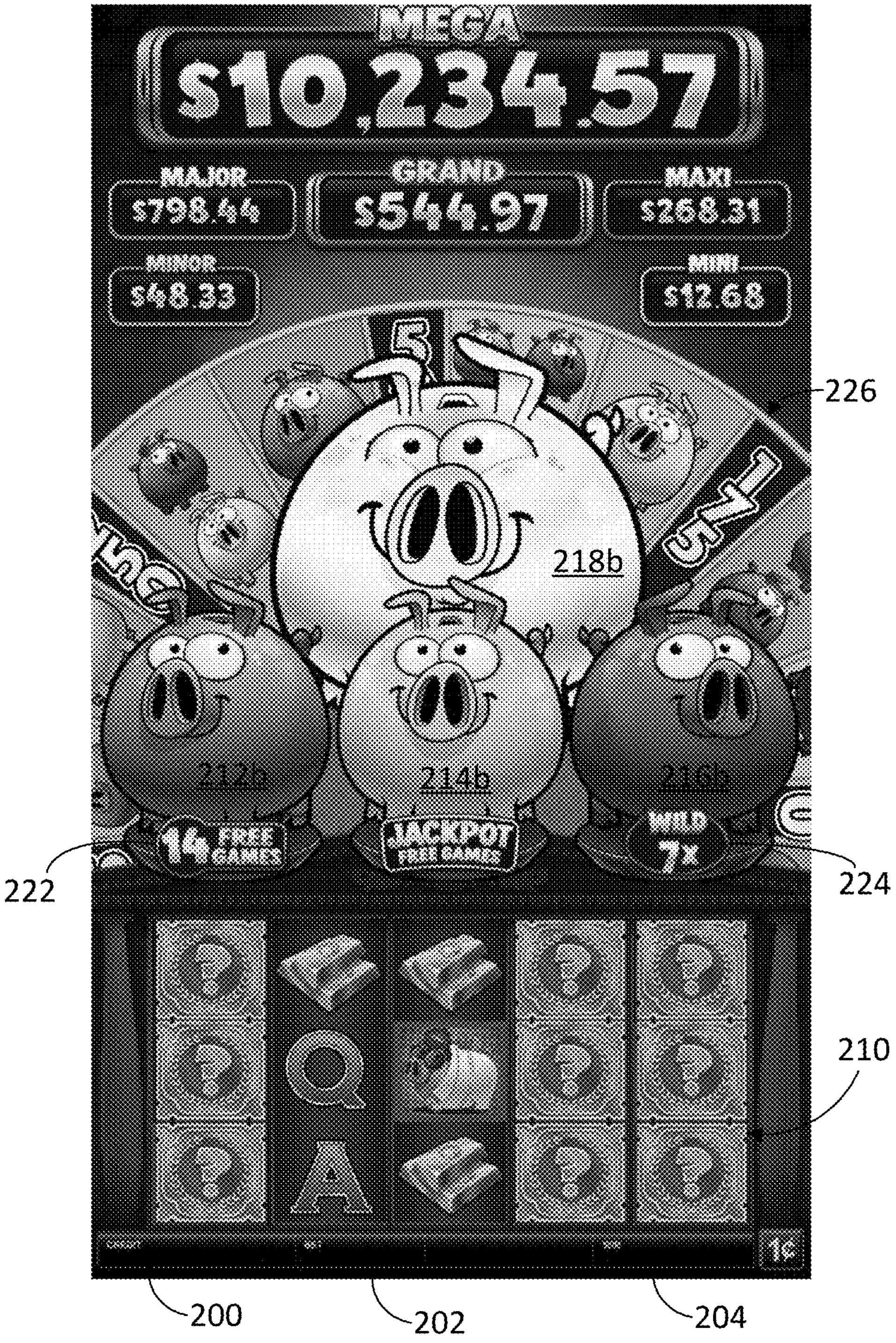
FIGS. 4 through 9 are exemplary presentations of spin outcomes wherein FIGS. 5, 6, and 8 contain accumulation symbols (e.g., coin symbols) associated with persistent elements (e.g., piggy banks).
Figure 5:
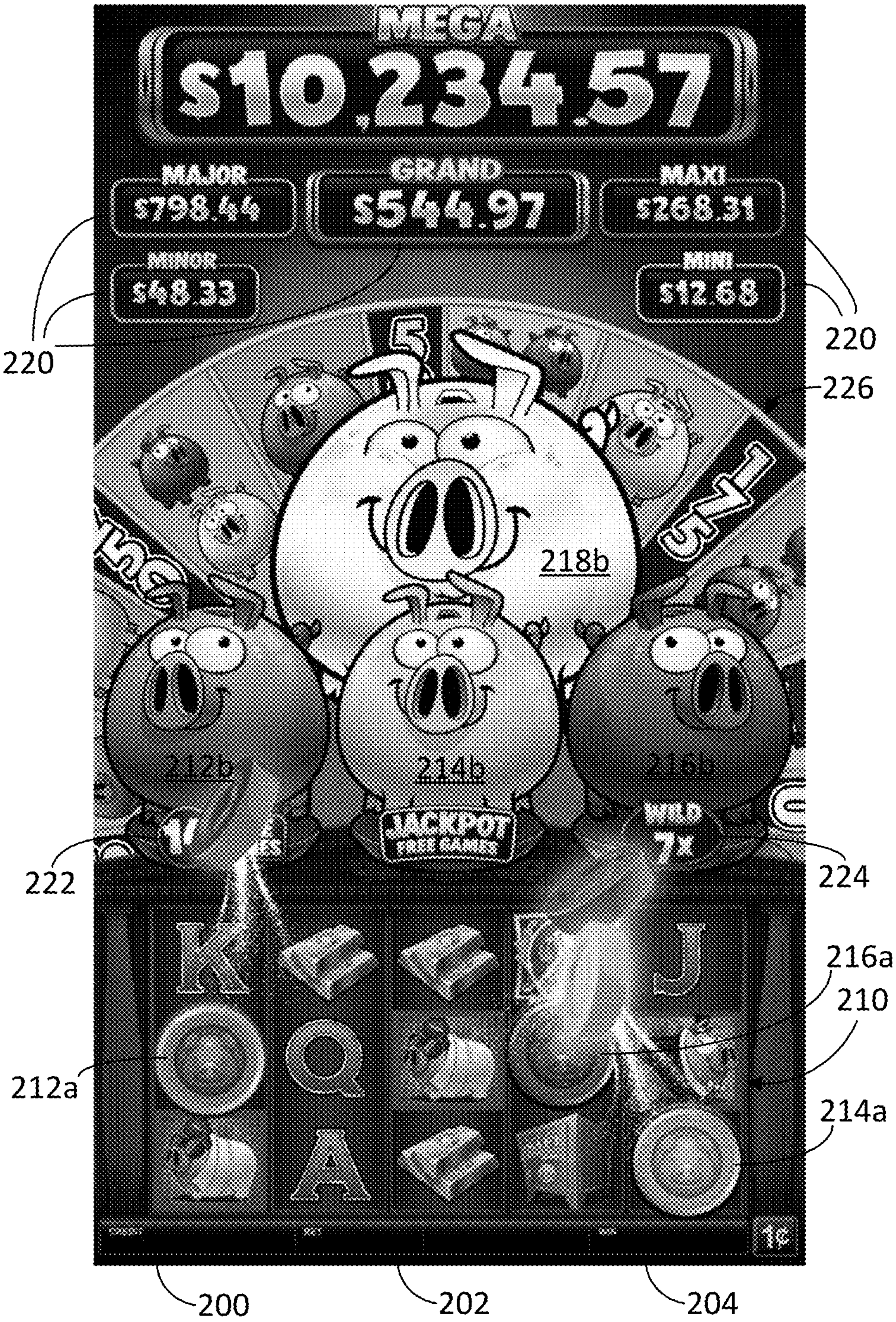
Figure 6:
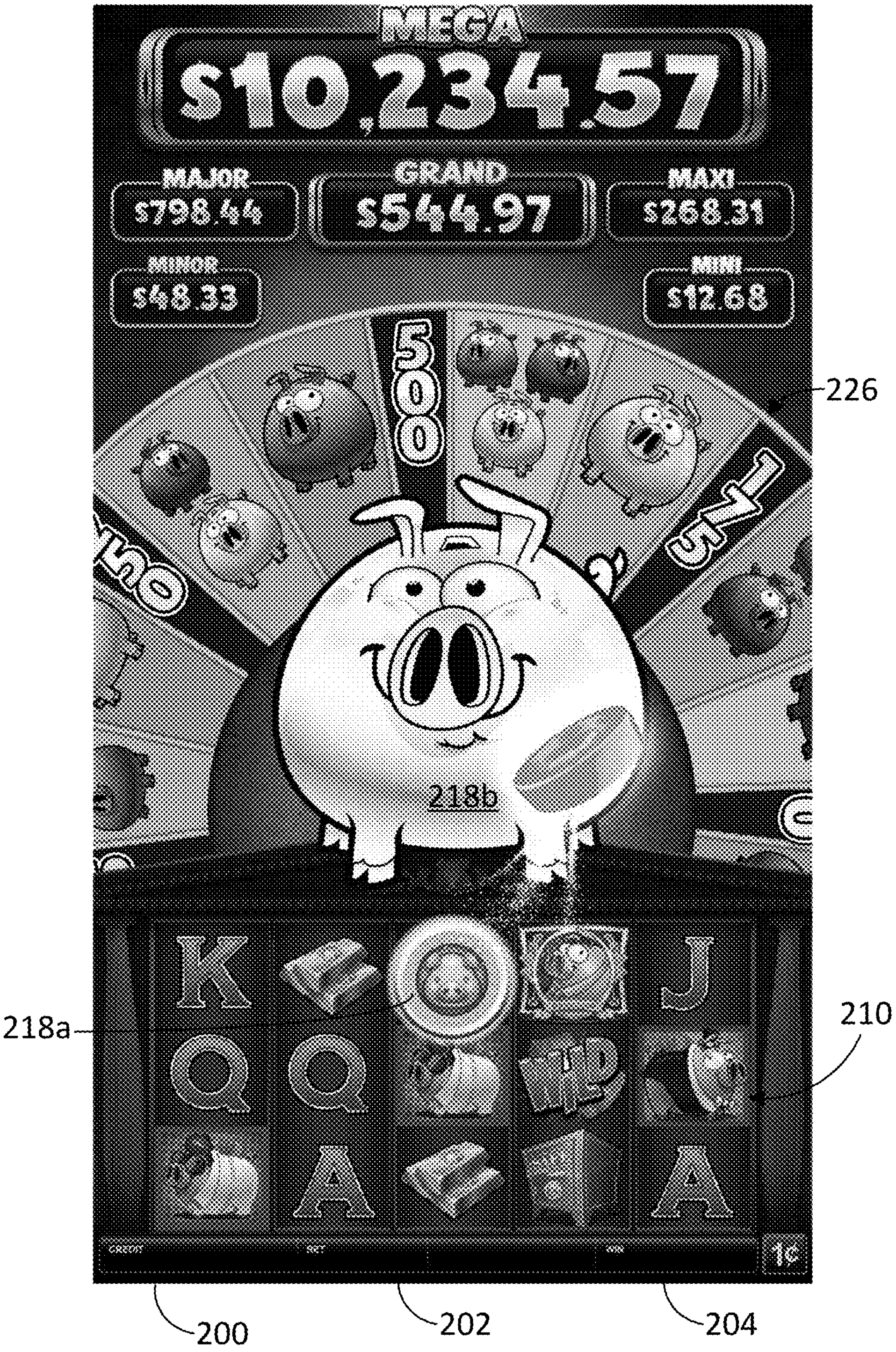
Figure 7:
Figure 8:
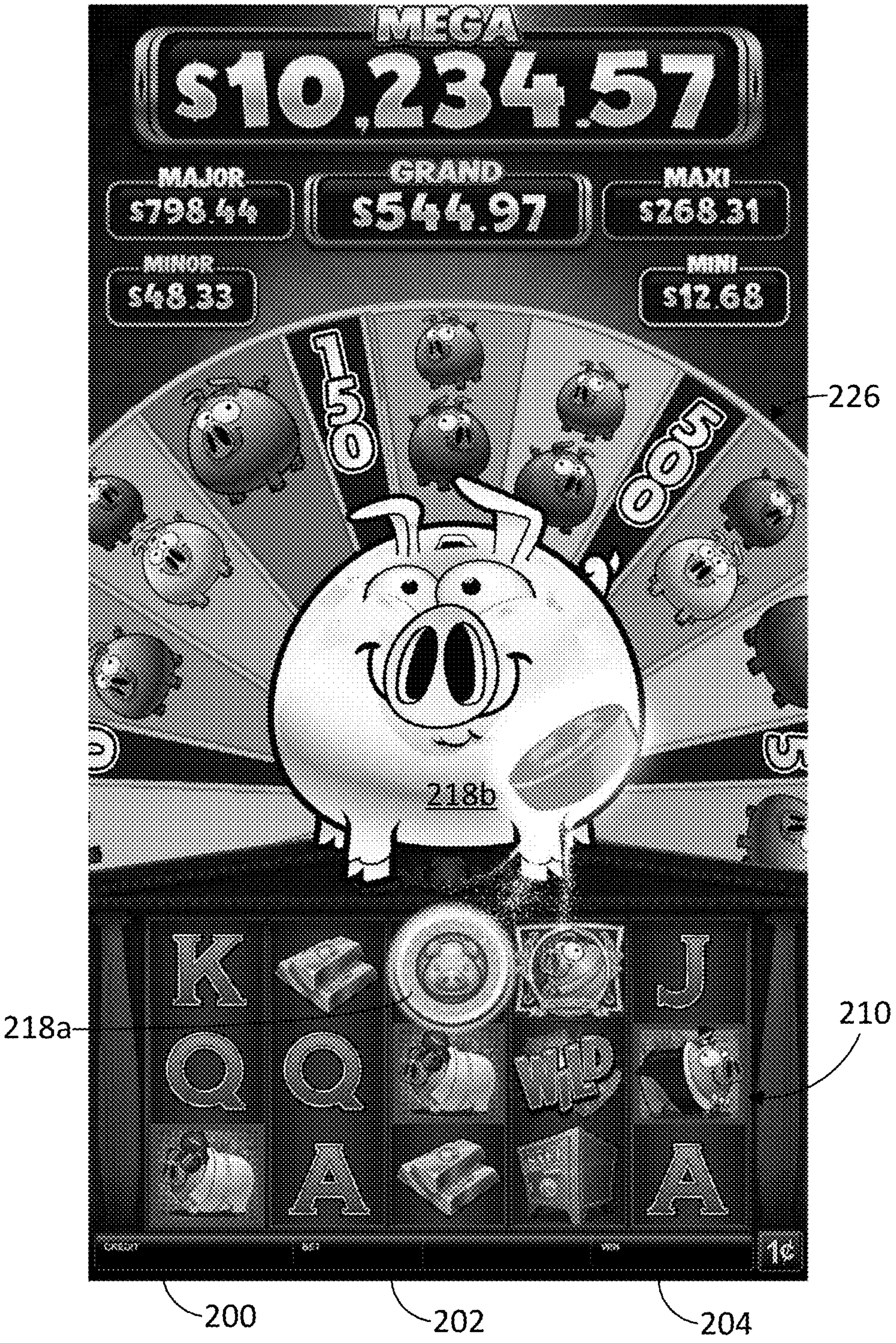
Figure 9:
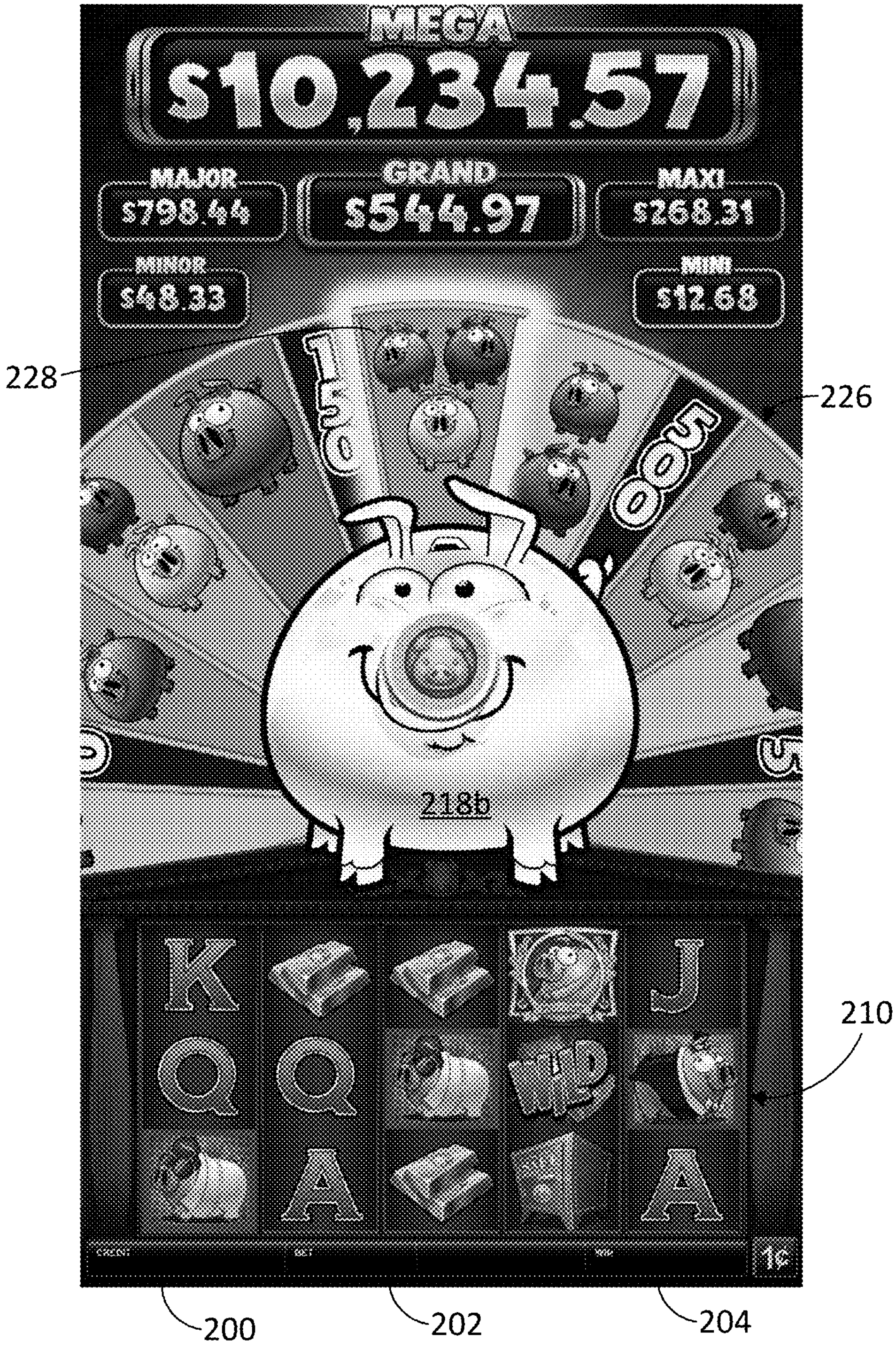

In FIGS. 4 through 9, a symbol array 210 in the base game has a three-by-five rectangular configuration, and each column of the array is associated with a respective reel. The reels bear a plurality of symbols that may, for example, include various base game symbols, a plurality of accumulation symbols, and a mystery (?) symbol that reveals a base game symbol or an accumulation symbol after the mystery (?) symbol lands in the array. The accumulation symbols may take the form of BLUE, YELLOW, and RED coin symbols 212*a*, 214*a*, and 216*a* (FIG. 5) and a WHITE coin symbol 218*a* (FIGS. 6 and 8). Players hope to land the BLUE, YELLOW, RED, and/or WHITE coin symbols in the symbol array 210 in order to win features according to rules associated with four persistent elements 212*b*, 214*b*, 216*b*, and 218*b*. The persistent elements 212*b*, 214*b*, 216*b*, and 218*b* may take the form of BLUE, YELLOW, RED, and WHITE piggy banks, respectively. The BLUE coin 212*a* is associated with the BLUE piggy bank 212*b* that can trigger a "Free Games" feature; the YELLOW coin 214*a* is associated with the YELLOW piggy bank 214*b* that can trigger a "Jackpot Free Games" feature; the RED coin 216*a* is associated with the RED piggy bank 216*b* that can trigger a "Multiplier" feature; and the WHITE coin 218*a* is associated with the WHITE piggy bank 218*b* that can trigger the spin of a wheel 226 which, in turn, can award a credit value or one or more of the aforementioned features.

At step 104, the game-logic circuitry detects, via a value input device, a physical item associated with a monetary value that establishes a monetary balance in the form of cash or credits. In FIGS. 4 through 9, the monetary balance may be shown on a credit meter 200.

At step 106, the game-logic circuitry initiates a wagering game cycle (i.e., spin cycle) in response to an input indicative of a wager covered by the monetary balance. To initiate a spin of the reels, the player may press a "Spin" or "Max Bet" key on a button panel or touch screen. In FIGS. 4 through 9, the wager may be shown on a bet meter 202.

At step 108, using an RNG, the game-logic circuitry spins and stops the plurality of reels to randomly land symbols from the reels in an array in visual association with one or more paylines (also known as lines, ways, patterns, or arrangements). In other words, the array is populated with symbols from the reels, and the populated array represents a spin outcome. The reel spin may be animated on a video display by depicting symbol-bearing strips moving vertically across the display and synchronously updating the symbols visible on each strip as the strip moves across the display. Alternatively, the reels may be physical/electromechanical reels. FIGS. 4 and 5 depict a base-game spin outcome before and after, respectively, the mystery (?) symbols therein have revealed their respective underlying symbols.

At step 110, the game-logic circuitry determines whether or not any coin symbols landed in the array populated by the reels. If no coin symbols landed in the array, the game-logic circuitry proceeds to step 114. If, however, one or more coin symbols landed in the array 210 as shown in the spin outcome examples in FIGS. 5, 6, and 8, the game-logic circuitry proceeds to step 112 where it adds each coin symbol to the piggy bank associated with that coin symbol and animates the growth in that piggy bank. In FIG. 5, the BLUE, YELLOW, and RED coin symbols 212*a*, 214*a*, and 216*a* are added to the BLUE, YELLOW, and RED piggy banks 212*b*, 214*b*, and 216*b*, respectively. In FIGS. 6 and 8, the WHITE coin symbol 218*a* is added to the WHITE piggy bank 218*b*. Multiple coin symbols of the same or different colors may appear in the array 210 at the same time.

When animating the addition of a coin symbol to its associated persistent element (e.g., piggy bank), the coin symbol may appear to "fly" off the array and land in the persistent element. The coin symbol may leave a trail of sparkles or the like as it flies to its associated persistent element. Animation representing the transfer each coin symbol from the array to its associated persistent element may be presented sequentially or in parallel. To represent the gradual addition of coins to the persistent element, the persistent element and/or the volume of coins therein may appear to grow in size. In accordance with some embodiments, the persistent element may be an object of fixed size accompanied by some other indication of accumulating value, for example, by a gradual change in color shading, for example, from light red to dark red. In other embodiments, the persistent element may change size and also show some other indication of increasing value, for example, the color of the display in the immediate area of the persistent element may gradually change as its value increases. The change or evolution in appearance of the persistent elements 212*b*, 214*b*, 216*b*, and 218*b* as coin symbols are added thereto persists from one wagering game cycle to the next such that the player perceives that a game feature corresponding to a persistent element may be getting closer to being triggered. When a game feature associated with the persistent element is triggered at step 116 discussed below, the appearance of the persistent element is visually reset, for example, to a smaller size and then evolves from that point in subsequent wagering game cycles.

The persistent elements 212*b*, 214*b*, 216*b*, and 218*b* are represented as piggy banks. The persistent elements may take forms other than the piggy banks, including for example coin pots, urns, vases, jars, jugs, cans, bowls, beehives, inflating balloons, ladders, dials, meters, etc. Similarly, the accumulation symbols associated with the persistent elements may take forms other than coins, including, for example, balloons, colored dollar signs, fire balls, etc. The coin symbols may or may not be color-matched to their respective persistent elements, provided their association to a persistent element is indicated. For example, the BLUE coins 212*a* and the BLUE piggy bank 212*b* may be colored blue, the YELLOW coins 214*a* and the YELLOW piggy bank 214*b* may be colored yellow, the RED coins 216*a* and the RED piggy bank 216*b* may be colored red, and the WHITE coins 218*a* and the WHITE piggy bank 218*b* may be colored white.

In one or more embodiments, the coin symbols may be carried on the reels as virtual "stickers" applied over an underlying base-game reel symbol. As part of the animation sequence at step 112, in which the coin is transferred to its associated persistent element, the coin "sticker" is removed from its location in the reel array to reveal the base-game reel symbol underneath. In other embodiments, the coin symbols may simply be removed from the array and replacement symbols may be randomly selected to take their places. In further embodiments, the coin symbols may remain in the array as "blocking symbols" that break up other potentially winning combinations of standard symbols. These approaches or combinations thereof all fall within the spirit and scope of the invention.

At step 114, after replacing any mystery (?) symbols with base game symbols, the game-logic circuitry awards standard payouts in accordance with a pay table. The pay table may, for example, include "line pays," "ways pays," and "scatter pays." Line pays occur when a predetermined type and number of symbols appear along an activated payline, typically in a particular order such as left to right, right to left, top to bottom, bottom to top, etc. Ways pays appear on adjacent reels without the requirement to be on a specified pay line or directly adjacent to one another. Scatter pays occur when a predetermined type and number of symbols appear anywhere in the displayed array without regard to position or paylines. Each payline preferably consists of a single symbol position in each column of the array. The number of paylines may be as few as one or as many as possible given each payline consists of a single symbol position in each column of the array. To animate a standard pay, the display may apply a border, pattern, color change, background change, watermark, or other distinguishing characteristic to the winning payline and/or winning symbols that contributed to the pay. Any awarded pays are added to a win meter 204.

At step 116, for each coin symbol added to an associated piggy bank, the game-logic circuitry randomly determines, via the RNG, whether or not to trigger a feature associated with the piggy bank to which the coin symbol was added. This random determination is independent of any prior wagering game cycles. In FIGS. 5, 6, and 8, the RNG odds of triggering the "Free Games" feature associated with the BLUE piggy bank 212*b* may be 100/1000 for each BLUE coin symbol 212*a* added to the BLUE piggy bank; the RNG odds of triggering the "Jackpot Free Games" feature associated with the YELLOW piggy bank 214*b* may be 60/1000 for each YELLOW coin symbol 214*a* added to the YELLOW piggy bank; the RNG odds of triggering the "Multiplier" feature associated with the RED piggy bank 216*b* may be 80/1000 for each RED coin symbol 216*a* added to the RED piggy bank; and the RNG odds of triggering the wheel 226 associated with the WHITE piggy bank 218*b* may be 40/1000 for each WHITE coin symbol 218*a* added to the WHITE piggy bank. The above odds are merely examples, and different odds could be applied.

If a feature associated with a piggy bank to which a coin symbol was added is not triggered at step 116, the game-logic circuitry randomly (using the RNG) upgrades that feature. In another embodiment, the game-logic circuitry always upgrades that feature when it is not triggered by the addition of a coin symbol to that feature's piggy bank. In FIG. 5, if the "Free Games" feature is not triggered by the BLUE coin symbol 212*a*, the number of free games associated with the BLUE piggy bank 212*b* may increase from the 14 free games shown in the meter 222 immediately below the BLUE piggy bank 212*b*. The amount of the increase may be by a predetermined amount (e.g., by 1 free game, by 2 free games, etc.) or by a random amount. To emphasize the increase, the meter 222 may be highlighted and/or the BLUE coin symbol 212*a* may "fly" into the meter. If the "Jackpot Free Games" feature is not triggered by the YELLOW coin symbol 214*a*, one or more of the progressive jackpots 220 that can be won during the free games associated with the YELLOW piggy bank 214*b* may be increased. To emphasize an increase in an affected progressive jackpot 220, the progressive jackpot may be highlighted, the YELLOW coin symbol 214*a* may "fly" into the progressive jackpot, and/or a streaming effect may be displayed between the YELLOW coin symbol or piggy bank 214*b* and the progressive jackpot. If the "Multiplier" feature is not triggered by the RED coin symbol 216*a*, the current multiplier value associated with the RED piggy bank 216*b* may increase from the 7× value shown in the meter 224 immediately below the RED piggy bank 216*b*. The amount of the increase may be by a predetermined amount (e.g., by 1×, by 2×, etc.) or by a random amount. To emphasize the increase, the meter 224 may be highlighted and/or the RED coin symbol 216*a* may "fly" into the meter.

In FIGS. 6 through 9, if the wheel 226 is not triggered by the WHITE coin symbol 218*a*, one or more of the prizes/awards on the wheel 226 associated with the WHITE piggy bank 218*b* may be upgraded. The prizes on the wheel 226 may, for example, be credit values or a set of one or more of the BLUE piggy bank feature, YELLOW piggy bank feature, or RED piggy bank feature (e.g., BLUE, YELLOW, RED, BLUE/YELLOW, BLUE/RED, YELLOW RED, and BLUE/YELLOW/RED). For prizes that are a set of one or more of the piggy bank features, the features are represented on the wheel by the BLUE, YELLOW, and RED piggy bank icons. In one example of an upgrade, a wheel wedge bearing a credit value is upgraded from 500 credits in FIG. 6 to 5000 credits in FIG. 7. In another example of an upgrade, a wheel wedge is upgraded from a set of BLUE and RED piggy bank features in FIG. 8 to BLUE, YELLOW, and RED piggy bank features in FIG. 9. In a further example of an upgrade, a wheel wedge may be upgraded from a set of a single piggy bank feature (e.g., BLUE piggy bank feature) to a set of a pair of piggy bank features (e.g., BLUE and YELLOW piggy bank features). The upgraded wedge may be highlighted. The benefit of this upgrade is described below.

The persistent elements 212*b*, 214*b*, 216*b*, and 218*b* exhibit both perceived persistence and true persistence. The odds of triggering a feature associated with a persistent element is independent of any change in appearance (e.g., growth in size) of that persistent element. This is perceived persistence in that the player may perceive that the feature is closer to being triggered as the persistent element grows when, in fact, the triggering odds remain the same. If a feature associated with a persistent element is not triggered, the feature may be upgraded as described above. Such upgrades provide the feature with a true persistence component in that once the feature is triggered, the feature is conducted using the upgrades.

If a feature associated with a piggy bank to which a coin symbol was added is triggered at step 116, the game-logic circuitry conducts the triggered feature at step 120. Any combination of BLUE, YELLOW, or RED coin symbols 212*a*, 214*a*, or 216*a* may trigger a series of free games. If the series of free games was triggered by a BLUE, YELLOW, and/or RED coin symbols, then, for each coin symbol involved, the term "WINNER" may appear in the associated piggy bank. If the series of free games was triggered by the BLUE coin symbol 212*a*, then the number of free games displayed in the meter 222 below the BLUE piggy bank 212*b* are awarded. If, however, the series of free games was not triggered by the BLUE coin symbol 212*a*, then a predetermined number of free games (e.g., 7 free games) are awarded. If the YELLOW coin 214*a* triggered the "Jackpot Free Games" feature associated with the YELLOW piggy bank 214*b*, then the appearance of jackpot symbols in the array during the free games may award one or more of the progressive jackpots 220 (see FIG. 5). The jackpot symbols may, for example, bear a MEGA, GRAND, MAJOR, MAXI, MINOR, or MINI label, representing a Mega Progressive, a Grand Progressive, a Major Jackpot, a Maxi Jackpot, a Minor Jackpot, or a Mini Jackpot, respectively. Any awarded progressive jackpots are reset. At the end of the feature, the Major, Maxi, Minor, and Mini progressive jackpots are reset. If the RED coin 216*a* triggered the "Multiplier" feature associated with the RED piggy bank 216*b*, then all winning combinations in the array involving a Wild multiplier during the free games are multiplied by the Wild multiplier displayed in the meter 224. At the end of the free games, the meter is reset to a Wild multiplier of 2×, for example. Each free game involves (i) spinning and stopping the plurality of reels to randomly land symbols from the reels in the array in visual association with one or more paylines and (ii) awarding payouts according to the pay table. As compared to the base game, an alternative set of reels may be used during the free games.

Alternatively, the WHITE coin symbol 218*a* may trigger a spin of the wheel 226 shown in FIGS. 6 through 9. For processing efficiency and ease of understanding the game, the game-logic circuitry is preferably programmed such that either the WHITE coin symbol 218*a* or any combination of BLUE, YELLOW, or RED coin symbols 212*a*, 214*a*, or 216*a* may appear in the array 210, but the WHITE coin symbol 218*a* cannot appear in the array 210 in the same base-game spin outcome as the BLUE, YELLOW, or RED coin symbols 212*a*, 214*a*, or 216*a*. If a spin of the wheel 226 was triggered by the WHITE coin symbol 218*a*, then the term "WINNER" may appear in the WHITE piggy bank 218*b*. The wheel 226 is spun and stopped in visual association with a stationary pointer (not shown) that indicates a winning prize wedge on the wheel.

As mentioned above, the prizes on the wheel 226 may, for example, be credit values or a set of one or more of the BLUE piggy bank feature, YELLOW piggy bank feature, or RED piggy bank feature (e.g., BLUE, YELLOW, RED, BLUE/YELLOW, BLUE/RED, YELLOW RED, and BLUE/YELLOW/RED). Thus, the wheel 226 serves as a back door to potentially awarding the features associated with the piggy banks. If the awarded prize is a credit value, the game-logic circuitry adds the awarded credit value to the win meter 204. If the awarded prize is a set of one or more of the BLUE piggy bank feature, YELLOW piggy bank feature, or RED piggy bank feature, the set of piggy bank feature(s) in the awarded prize are conducted as described above. That is, if the awarded prize includes the BLUE piggy bank feature, then the number of free games displayed in the meter 222 below the BLUE piggy bank 212*b* are awarded. If, however, the awarded prize does not include the BLUE piggy bank feature, then 7 free games are awarded. If the awarded prize includes the YELLOW piggy bank feature ("Jackpot Free Games" feature), then the appearance of jackpot symbols in the array during the free games may award one or more of the progressive jackpots 220 (see FIG. 5). If the awarded prize includes the RED piggy bank feature ("Multiplier" feature), then all winning combinations in the array involving a Wild multiplier during the free games are multiplied by the Wild multiplier displayed in the meter 224. Any pays from the free games are added to the win meter 204.

After conducting the triggered feature(s) at step 120 and randomly upgrading any non-triggered features at step 118, the game-logic circuitry ends the current wagering game cycle and proceeds to step 122. At step 122, the game-logic circuitry determines whether or not it has received a cashout input via at least one of the one or more player input devices of the gaming machine. If it has not received a cashout input, the game-logic circuitry waits for the next wager input at step 106. If it has received a cashout input, the game-logic circuitry initiates a payout from the monetary balance on the meter 200 in FIGS. 4 through 9 via a value output device. The data processing method then ends at step 124.

The recitations of a value input device for establishing a monetary balance, an input device for accepting a wager input that initiates a spin, and a value output device for paying out the monetary balance are integrally incorporated within the steps of the data processing method. For example, the presentation of game outcomes through the spinning and stopping of the reels is essential to the game outcome determinations, which may only be initiated by the accepted wager input. Furthermore, a value input device for establishing a monetary balance, an input device for accepting a wager that initiates a spin, and a value output device for paying out the monetary balance are physical, structural elements that are not shared by generic or well-known computing devices but, rather, are particular to gaming machines.

Embodiments of the present invention realize benefits in increased computer processing efficiency with minimized processing overhead, fewer rules to be evaluated, fewer player inputs to be monitored, and simpler graphical representations. With respect to the feature triggering process, if no coin symbols appear in the array at step 110, the game-logic circuitry foregoes any random determination of whether a feature will be triggered. And if, for example, one or more features are triggered, the game-logic circuitry follows a simple set of rules for conducting the triggered feature(s). In contrast, in typical prior art systems with mystery bonus triggers, the game-logic circuitry makes a random determination in each and every wagering game cycle. And if one or more features are won, the features typically involve complex rules and/or multiple RNG determinations. This reduces processing efficiency compared to the method presented herein.

In this description, numerous specific details are set forth. However, it is understood that embodiments of the invention may be practiced without these specific details. In other instances, well-known circuits, structures and techniques have not been shown in detail in order not to obscure the understanding of this description. Note that in this description, references to "one embodiment" or "an embodiment"

mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein. Each claim, as may be amended, constitutes an embodiment of the invention, incorporated by reference into the detailed description. Moreover, in this description, the phrase "exemplary embodiment" means that the embodiment being referred to serves as an example or illustration.

Block diagrams illustrate exemplary embodiments of the invention. Flow diagrams illustrate operations of the exemplary embodiments of the invention. The operations of the flow diagrams are described with reference to the example embodiments shown in the block diagrams. However, it should be understood that the operations of the flow diagrams could be performed by embodiments of the invention other than those discussed with reference to the block diagrams, and embodiments discussed with references to the block diagrams could perform operations different than those discussed with reference to the flow diagrams. Additionally, some embodiments may not perform all the operations shown in a flow diagram. Moreover, it should be understood that although the flow diagrams depict serial operations, certain embodiments could perform certain of those operations in parallel or in a different sequence.

Each of these embodiments and obvious variations thereof is contemplated as falling within the spirit and scope of the claimed invention, which is set forth in the following claims. Moreover, the present concepts expressly include any and all combinations and subcombinations of the preceding elements and aspects.

What is claimed is:

1. A method of operating a gaming machine, the gaming machine including a gaming cabinet and game-logic circuitry secured within a locked box inside the gaming cabinet, the game-logic circuitry including memory storing programming for a random number generator (RNG) and a wagering game that determines game outcomes, the method comprising the operations of:

prior to spinning and stopping the plurality of symbol-bearing reels, executing an authentication program on the gaming machine to authenticate at least the RNG Programming and the wagering-game programming that determines game outcomes, wherein executing the authentication program comprises generating a live authentication code derived from contents of the memory and comparing the live authentication code to a trusted code stored in the memory, and permitting execution of the RNG programming and the wagering-game programming only upon a match;

accepting, via a value input device, a physical item associated with a monetary value to establish a monetary balance;

recording, in the memory, stored data indicative of the monetary balance;

displaying, by a presentation assembly, a plurality of symbol-bearing reels, an array, a first persistent element, a second persistent element, a third persistent element, a fourth persistent element, and a wheel, the first persistent element being associated with a first feature including the wheel, the second, third, and fourth persistent elements being associated with respective second, third, and fourth features, the wheel having a plurality of wedges bearing respective prizes, wherein the plurality of prizes include sets of one or more of the second, third, or fourth features;

spinning and stopping the plurality of symbol-bearing reels to land symbols from the reels in the array;

in response to the landed symbols including second, third, or fourth accumulation symbols, randomly determining whether or not to award the respective second, third, or fourth features;

in response to not awarding the respective second, third, or fourth features as a result of the determining operation, upgrading the respective second, third, or fourth features;

in response to the landed symbols including a first accumulation symbol:

animating, on the presentation assembly, an addition of the first accumulation symbol to the first persistent element; and randomly determining, via the RNG, whether or not to award a spin of the wheel;

in response to not awarding the spin of the wheel as a result of the determining operation, upgrading at least one of the prizes on the wheel, wherein the upgrading operation includes upgrading at least one of the sets to include at least one of the second, third, or fourth features that is absent from the at least one of the sets prior to the upgrading;

in response to awarding the spin of the wheel as a result of the determining operation, spinning and stopping the wheel to award at least one of the prizes thereon; and receiving, via an electronic input device, a cash out input that initiates a payout from the monetary balance via a value output device.

2. The method of claim 1, wherein the plurality of prizes include credit values, wherein the upgrading operation includes increasing at least one of the credit values.

3. The method of claim 1, wherein prior to the upgrading operation, the at least one of the sets includes a single one of the second, third, or fourth features, and wherein after the upgrading operation, the at least one of the sets includes two of the second, third, or fourth features.

4. The method of claim 1, wherein prior to the upgrading operation, the at least one of the sets includes two of the second, third, or fourth features, and wherein after the upgrading operation, the at least one of the sets includes the second, third, and fourth features.

5. The method of claim 1, wherein the animating operation includes providing a visual indication of accumulating value at the first persistent element to which the accumulation symbol is added.

6. The method of claim 1, wherein the plurality of reels are electromechanical reels.

7. A gaming machine comprising:

a gaming cabinet;

a value input device configured to accept a physical item associated with a monetary value to establish a monetary balance;

a value output device configured to dispense a payout from the monetary balance in response to a cashout input;

a presentation assembly configured to display a plurality of symbol-bearing reels, an array, a first persistent element, a second persistent element, a third persistent element, a fourth persistent element, and a wheel, the first persistent element being associated with a first feature including the wheel, the second, third, and fourth persistent elements being associated with respective second, third, and fourth features, the wheel having a plurality of wedges bearing respective prizes, wherein the plurality of prizes include sets of one or more of the second, third, or fourth features; and game-logic circuitry secured within a locked box inside the gaming cabinet, the game-logic circuitry including at least one processor and memory storing programming for a random number generator (RNG) and a wagering game that determines game outcomes, configured to perform the operations of:

prior to spinning and stopping the plurality of symbol-bearing reels, executing an authentication program to authenticate at least the RNG programming and the wagering-game programming that determines game outcomes, wherein executing the authentication program comprises generating a live authentication code derived from contents of the memory and comparing the live authentication code to a trusted code stored in the memory, and permitting execution of the RNG programming and the wagering-game programming only upon a match;

spinning and stopping the plurality of symbol-bearing reels to land symbols from the reels in the array;

in response to the landed symbols including second, third, or fourth accumulation symbols, randomly determining whether or not to award the respective second, third, or fourth features;

in response to not awarding the respective second, third, or fourth features as a result of the determining operation, upgrading the respective second, third, or fourth features;

in response to the landed symbols including a first accumulation symbol:

animating, on the presentation assembly, an addition of the first accumulation symbol to the first persistent element; and randomly determining, via the RNG, whether or not to award a spin of the wheel;

in response to not awarding the spin of the wheel as a result of the determining operation, upgrading at least one of the prizes on the wheel, wherein the upgrading operation includes upgrading at least one of the sets to include at least one of the second, third, or fourth features that is absent from the at least one of the sets prior to the upgrading; and in response to awarding the spin of the wheel as a result of the determining operation, spinning and stopping the wheel to award at least one of the prizes thereon.

8. The gaming machine of claim 7, wherein the plurality of prizes include credit values, wherein the upgrading operation includes increasing at least one of the credit values.

9. The gaming machine of claim 7, wherein prior to the upgrading operation, the at least one of the sets includes a single one of the second, third, or fourth features, and wherein after the upgrading operation, the at least one of the sets includes two of the second, third, or fourth features.

10. The gaming machine of claim 7, wherein prior to the upgrading operation, the at least one of the sets includes two of the second, third, or fourth features, and wherein after the upgrading operation, the at least one of the sets includes the second, third, and fourth features.

11. The gaming machine of claim 7, wherein the animating operation includes providing a visual indication of accumulating value at the first persistent element to which the accumulation symbol is added.

12. The gaming machine of claim 7, wherein the plurality of reels are electromechanical reels.

* * * * *